United States Patent [19]
Cure

[11] Patent Number: 5,568,112
[45] Date of Patent: Oct. 22, 1996

[54] METHOD AND APPARATUS FOR REDUCING THE STRENGTH OF PULSATING MAGNETIC FIELDS

[76] Inventor: Jorge Cure, 3244 NW. 25 Way, Boca Raton, Fla. 33434

[21] Appl. No.: 110,082

[22] Filed: Aug. 20, 1993

Related U.S. Application Data

[63] Continuation-in-part of Ser. No. 883,103, May 14, 1992, abandoned.

[51] Int. Cl.$^6$ .................................................. H01H 5/00
[52] U.S. Cl. ............................ 335/214; 335/301; 315/8
[58] Field of Search ........................... 335/210–214, 335/301; 174/32, 35 R, 35 GC, 35 CE, 35 MS, 35 TS; 315/8, 85; 361/149, 150

[56] References Cited

U.S. PATENT DOCUMENTS

| | | | |
|---|---|---|---|
| 4,634,930 | 1/1987 | Toshiyasu et al. | 315/8 |
| 4,891,468 | 1/1990 | Andrae | 174/35 MS |
| 4,931,625 | 6/1990 | Marlinski | 219/528 |
| 4,992,624 | 2/1991 | Benson et al. | 174/35 R |
| 5,107,179 | 4/1992 | Vidovich | 315/85 |
| 5,191,307 | 3/1993 | Hashimoto et al. | 335/214 |
| 5,350,973 | 9/1994 | Yokota et al. | 315/8 |
| 5,355,107 | 10/1994 | Hwang et al. | 335/214 |
| 5,400,088 | 3/1995 | Jones | 348/819 |
| 5,473,221 | 12/1995 | Do et al. | 315/8 |

*Primary Examiner*—Brian W. Brown
*Assistant Examiner*—Raymond M. Barrera
*Attorney, Agent, or Firm*—Herbert L. Lerner; Laurence A. Greenberg

[57] ABSTRACT

An apparatus and a method for reducing VLF pulsating magnetic field generated by electronic devices to less than about 0.25 mG beyond about 20 inches from said device. The apparatus includes a closed inert circuit having a number of windings effective to accomplish the reduction.

19 Claims, 5 Drawing Sheets

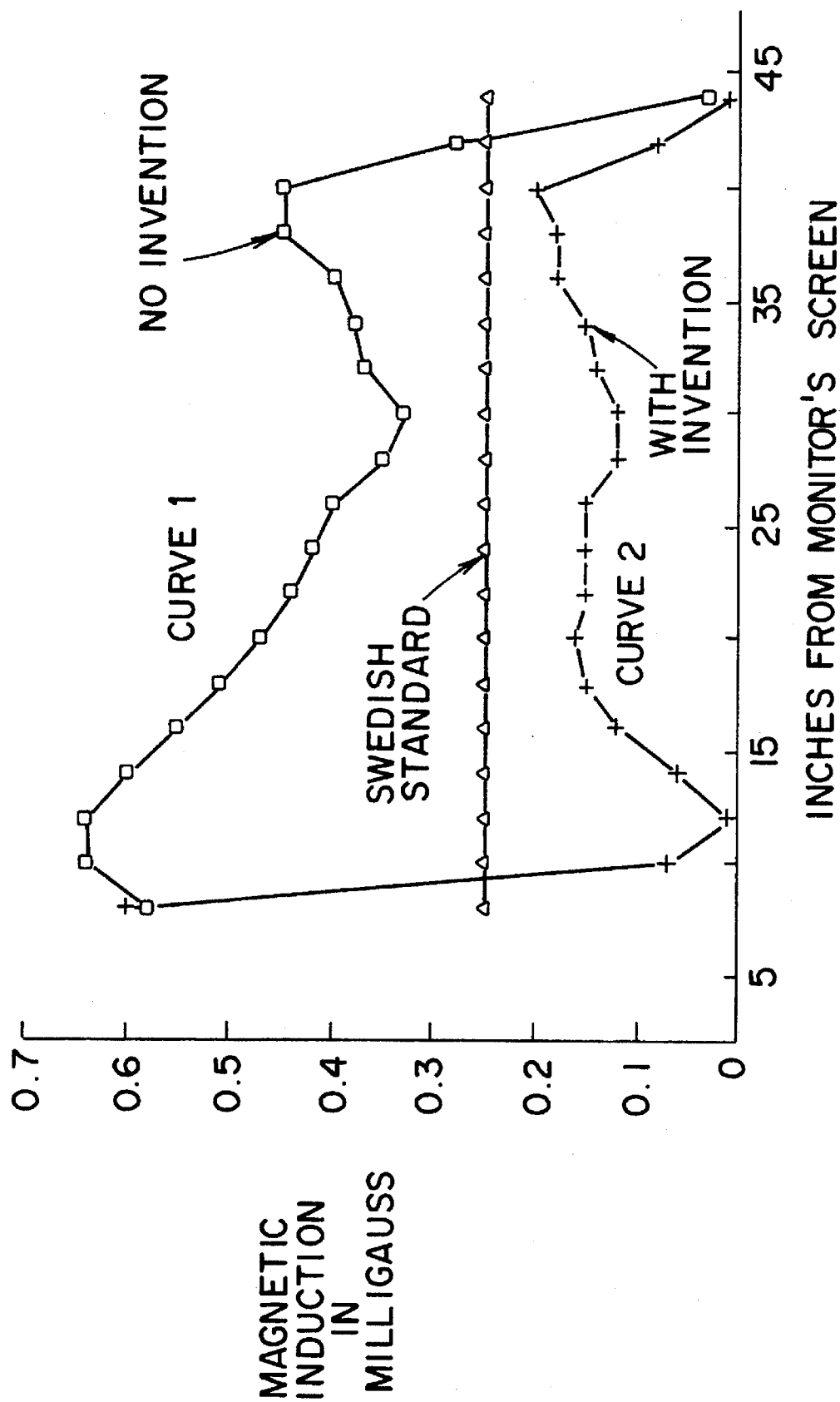

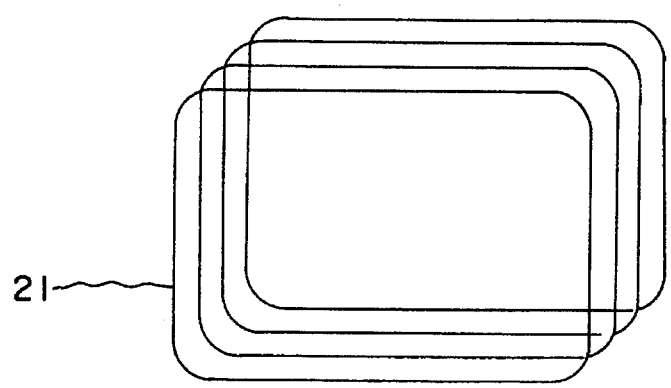
Fig. 2a
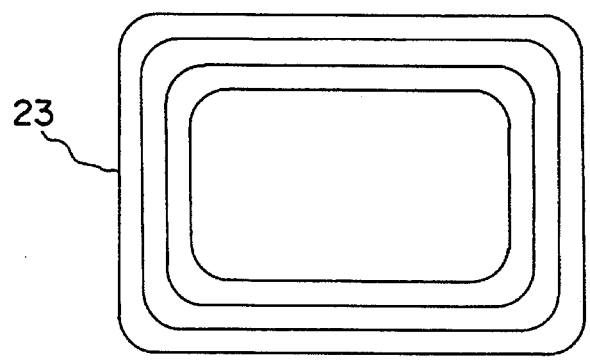
Fig. 2b
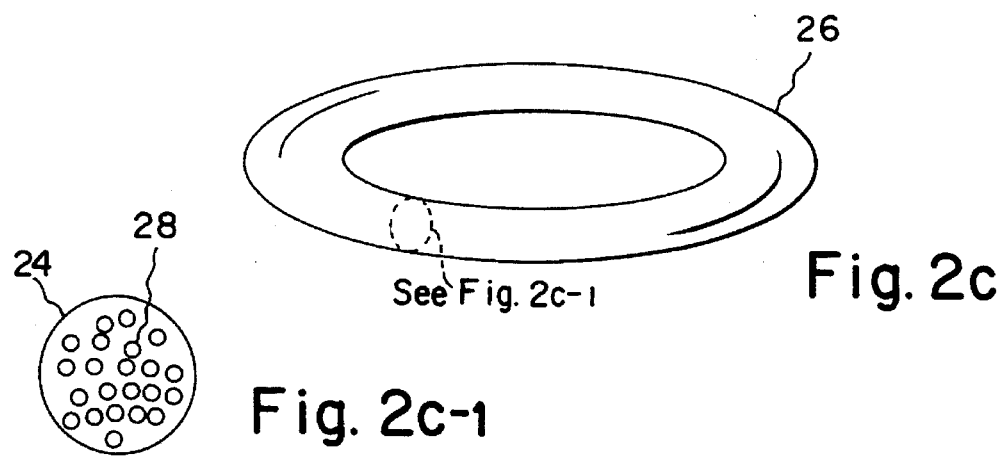
Fig. 2c
Fig. 2c-1

METHOD AND APPARATUS FOR REDUCING THE STRENGTH OF PULSATING MAGNETIC FIELDS

CROSS-REFERENCE TO RELATED APPLICATION

This application is a continuation-in-part of application Ser. No. 07/883,103, now abandoned, filed May 14, 1992.

BACKGROUND OF THE INVENTION

Field of the Invention

The present invention relates generally to a method and apparatus for reducing the strength of pulsating magnetic fields generated by various electronic devices.

Recently, it has been discovered that pulsating magnetic fields as well as varying electromagnetic fields affect biological matter and, consequently, cause health problems in human and animals, ranging from miscarriages to cancer. These discoveries have been made under laboratory conditions and through epidemiological studies.

Pulsating magnetic fields are very prevalent in modern society. Many of the electric devices man contacts in daily life emit pulsating magnetic fields. In television (TV) sets, video display terminals (VDT), personal computer monitors (PCM), etc., the pulsating magnetic field is produced by the deflecting magnetic coils which control the electron beam forming the display. The induced electric fields produced by the pulsating magnetic field associated with the deflecting magneticcoils in VDT, PCM, and TV sets expose human beings to prolonged action of extremely low frequency (ELF)and very low frequency (VLF) induced electric fields. Unreduced by shielding means these fields are generally greater than 1 milligauss.

In addition, biological effects may be induced by low frequency pulsating magnetic fields generated by high power lines and substation transformers. Electrical appliances, spark plugs in cars and trucks and electric devices used in home and offices also produce pulsating magnetic fields with strengths greater than 1 milligaus (mG). Among these are electric razors, fluorescent light transformers, electric clocks, hair dryers, electric heaters, microwave ovens, personal radio transmitters, and electric blankets. In fact, it has been published that there is a significant correlation between electric blankets and miscarriages. Even in hospitals operating rooms, due to the high-tech electronic instrumentation, hazardous electromagnetic fields have been detected.

Presently,there are no uniform standard for minimum magnetic field exposure. Epidemiological studies suggest that ELF values over 2–3 mG are hazardous for the health of humans under continuous exposure to these pulsating magnetic fields. At least one national authority in the biological effects of electromagnetic fields recommends a maximum exposure value of 0.3 mG. An advisory board to the Swedish government suggests a maximum VLF value of 0.25 mG for magnetic induction as measured at 20 inches from the screen of VDTs, PCMs, and TV sets.

There are several collections of experimental results and theoretical discussions of the effects of electromagnetic fields. Of interest is Handbook of Biological Effects of Electromagnetic Fields, Ed. C. Polk and E. Postow, CRC Press, Inc., Boca Raton Fla., 1988, Part II, Chapters 2, 3 and 5, in which biological effects are considered in relation to the action of ELF electromagnetic fields. In the group of epidemiological related to ELF fields, the paper by N. Werthemer and E. Leeper, American Journal of Epidemiology, vol. 109, 273 (1979), is very illustrative about the relationship between exposure to 60 Hz magnetic fields from electric lines and childhood cancer. Another paper by J. Phillips et al., International Radiation Biology, 49, 463, (1986), shows that 60 Hz magnetic and electromagnetic fields increase the rate of growth of human cancer cells. Also, R. O. Becker, M.D., in Cross Currents: The Promise of Electromedicine— The Perils of Electropollution, Jeremy P. Tarcher, Inc., Los Angeles, Calif., 1990, p. 270, comments that studies "indicate that residential exposure to ambient fields greater than 3 milligauss are significantly related to increases in the incidence of childhood cancer. There is good evidence that such fields may also be associated with adult cancers. In risk protection, a factor of ten is generally applied. In this case, that would drop the theoretical safe level to 0.3 milligauss." Becker says: "Because of practical considerations, I advocate a maximum strength of 1 milligauss for continuous exposure to 60 Hz fields. Finally the paper by J. C. Cure', Cancer: An Electrical Phenomenon, Part 1 of 3, published in Health Consciousness, vol. XII, no. 5, p. 83, Oct. 1991, shows the electrophysical basis of the action of electromagnetic fields at a cellular level.

As it is well known the magnetic permeability of an immense variety of materials, including biological matter, is practically equal to the magnetic permeability of vacuum. This fact implies that permanent and pulsating magnetic fields penetrate and go through practically every kind of substances with the exception of ferromagnetic materials. Thus, to block magnetic fields with material shields is not practical unless one is willing to use enclosures made out of expensive ferromagnetic materials. Accordingly, magnetic field exposure represents a serious health problem that demands prompt solutions. U.S. Pat. No. 4,634,930 to Toshiyasu discloses a device which comprises a coil placed internal to a cathode ray tube display device for the purpose of cancelling electromagnetic field noise generated by the deflection yokes of the cathode ray tube.

U.S. Pat. No. 4,931,625 to Marlinski, discloses a device for shielding electromagnetic radiation. The device includes a cover arranged to enclose the heating means so as to block and contain the electromagnetic radiation emitted from heating pads and other similar devices. The cover has a layer of electrically conductive material and a ground connection for electrically grounding the conductive layer.

U.S. Pat. No. 4,891,468 to Andrae discloses a device to shield against electromagnetic fields. This invention relates to a device consisting of a shielding film of metal, in particular aluminum or metalized plastic, to shield against an electromagnetic field.

U.S. Pat. No. 4,992,624 to Benson et al., discloses a magnetic shield for visual display terminals. The invention is designed to shield the pulsating magnetic field created by the flyback transformer of a cathode ray tube display terminal. The magnetic shield consists of a layer of metal conductor, for example mu metal (magnalloy), and a layer of insulator (like polyester film), placed on top of the metal layer. The double layer is rolled to adopt the shape of a cylinder, which is installed around the flyback transformer.

U.S. Pat. No. 5,107,179 to Vidovich discloses a stray electromagnetic field reducing device comprising a pair of closed wire loops placed inside a cathode ray tube device and in physical contact with the cathode ray tube. One loop includes a capacitive element to cause the loop to form a resonant circuit. The resonant circuit allows greater induced current to flow in the loop with the consequence of improved cancellation of the stray cathode ray tube device generated fields.

Patents to Vidovich and to Toshiyasu, et. al. do not teach a device external to the cathode ray tube (CRT) enclosure, in fact, both patents disclose devices in physical contact with the CRT itself. Consequently, no disclosure to date has provided an external means of field cancellation for such devices as televisions and personal computers. Presently, there are approximately 100 million personal computers in the United States and many more world wide which were manufactured without benefit of the internal field cancellation devices disclosed by Vidovich and Toshiyasu et al. The present invention addresses a means for upgrade of these computers, and other devices using CRT's by simple placement of the present invention external to the computer or other CRT device.

SUMMARY OF THE INVENTION

It is accordingly an object of the invention to provide a method and apparatus for reducing the strength of pulsating magnetic fields, which overcome the hereinafore-mentioned disadvantages of the heretofore-known devices of this general type.

With the foregoing and other objects in view there is provided, in accordance with the invention, an apparatus for reducing stray pulsating magnetic fields generated by a cathode ray tube device, said apparatus comprises a system of electrically insulated conducting loop circuits which are placed external, but in proximity to said cathode ray tube device.

The present invention is an apparatus for reducing the pulsating magnetic fields generated by a CRT. The apparatus which is placed external to the CRT device includes a set of closed loop circuits of sufficient number to reduce the stray pulsating magnetic field emanated by the CRT device into the volume external to the CRT device.

Several objects and advantages of the present invention are:

(a) to provide a device which does not require internal modification of the CRT device in the reduction of stray magnetic fields.

(b) To provide retrofit protection to users of CRT devices from the stray very low frequency (VLF) pulsating magnetic fields emanated by these devices.

(c) to provide users of CRT devices with a cost effective means of reducing the stray pulsating magnetic fields emanating from these devices.

(d) to provide a physically aesthetic field cancelling device for external attachment to a CRT device.

(e) to provide a field cancelling device which is easy to install.

Other features which are considered as characteristic for the invention are set forth in the appended claims.

Although the invention is illustrated and described herein as embodied in a method and apparatus for reducing the strength of pulsating magnetic fields, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a plot illustrating the effectiveness of the present invention in reducing the magnitude of the magnetic induction generated by a cathode ray tube device.

FIG. 2a is a pictorial diagram of the parallel loop geometry for a subassembly of the present invention.

FIG. 2b is a pictorial diagram of the concentric loop geometry for a subassembly of the present invention.

FIG. 2c is a pictorial diagram of the bundles geometry for a subassembly of the present invention.

DESCRIPTION OF THE PREFERRED EMBODIMENTS

Figure 3:
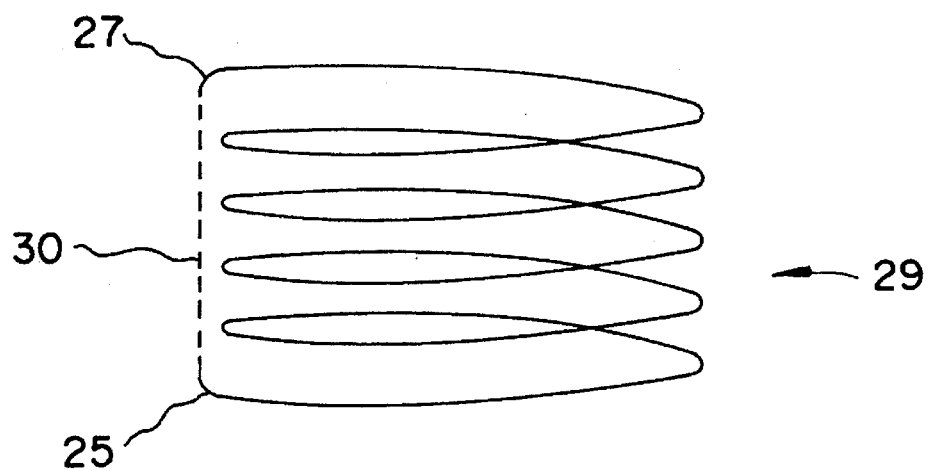
FIG. 3 is a pictorial diagram of the coil geometry for a subassembly of the present invention.

The invention will now be described with reference to specific embodiments and specific language will be used to describe the same. It is not intended that this description unduly limit the scope of the invention. Further embodiments are contemplated within the scope of the invention as will be understood by those ordinarily skill in the art.

It is not essential to the present invention to understand the theory behind its effectiveness. Yet, to aid understanding, the theoretical basis thereof will be discussed. This discussion is not intended to limit the invention in any way. The method is based on Faraday's law of electromagnetic induction. The electronic device generating the pulsating magnetic field is surrounded by an apparatus having the structure of a number of windings. To some extent, the counter magnetic field cancels the original magnetic field. In this way, the resultant pulsating magnetic field in the space beyond windings is reduced in strength and, in consequence, diminishes the intensity of the induced electric field acting in biological matter present in the volumetric region proximal to the electronic device.

The present invention consists of a system of electrically insulated conducting loop circuits which are placed external, but in proximity to a cathode ray tube device for the purpose of reducing the stray pulsating magnetic fields emanated by such a device. The system of conducting loop circuits reduces the strength of the magnetic field in the space outside the conducting loop circuits.

Referring now to the figures of the drawing in detail and first, particularly, to FIG. 1 thereof, there is seen plots of the magnetic flux density associated with an example CRT device as a function of distance from the screen of such a device for the cases of a solitary CRT device and a CRT device using the present invention. The horizontal axis is in units of inches while the vertical axis is in units of milligauss. The effectiveness of the present invention is illustrated by comparison of curve 1 which represents the magnetic field of the solitary CRT device and curve 2 which represents the reduced magnetic field of the CRT device employing the present invention. It is to be noted that the present invention reduces the magnetic flux density to less than 0.25 milligauss at 20 inches from the screen of the CRT device.

The present invention comprises a system of insulated conducting loop circuits organized into a set of separate electrically insulated conducting loop subassemblies.

Alternative conductor topologies for such a subassembly include a multiple loop, coil and combination multiple loop-coil versions. FIGS. 2 depicts the multiple loop topology of a subassembly. In FIG. 2a, is shown a parallel loop geometry in which multiple closed loop conducting circuits 21 are placed in close proximity and largely parallel to one another. FIG. 2b shows a concentric loop geometry in which the conducting loop circuits 23 are placed in close proximity to one another and are largely concentric. The individual conducting loop circuits can be formed from wire or printed circuit board conductors. In the parallel loop geometry of FIG. 2a, multiple printed circuit boards can be stacked together to form the parallel loops. In yet another version shown in FIG. 2c, the individual circuits can be bundled together in a largely annular geometry. A cross-section 24 of the outer annular envelope 26 of this geometry depicts a random placement of the conducting loops within the annulus as represented by the cross-sections of the individual loop conductors 28. The individual circuits are electrically insulated by coating with any of a number of conventional insulating coatings such as plastic, enamel or lacquer. FIG. 3 depicts the coil topology of a subassembly. In this topology, the ends 25 and 27 of a multi-turn coil 29 are electrically connected as depicted by the dashed line 30 to form a closed circuit. The coil can be formed from wire or from multiple layers of circuit boards having the loop of each layer appropriately connected to loops of adjacent layers through edge connections. Conventional multilayer circuit boards can also be used to achieve an effective coil geometry. A degenerate subset of the subassembly geometries described above is that of a single closed loop.

Figure 4:
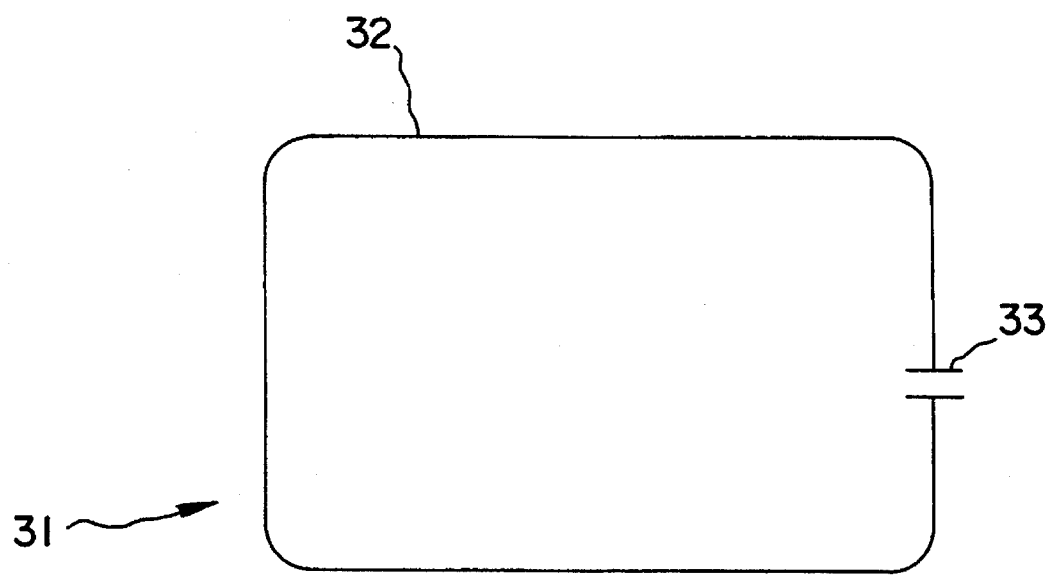
FIG. 4 is a schematic diagram of a subassembly resonant loop circuit.

The larger the magnitude of the currents induced in the closed loop circuits of the present invention, the greater will be the cancellation of stray magnetic field from the CRT device. The currents induced in the closed loop circuits of the present invention are limited by the circuit impedance. The impedance can be reduced by operating these circuits at resonance. Since the reactive component of the circuit impedance is dominated by inductance, resonance is achieved by including a series capacitor in the circuit. The value of the capacitor is chosen to provide a resonant frequency close to the main frequency of the CRT stray pulsating magnetic fields. FIG. 4 is a schematic diagram of a subassembly loop resonant circuit 31 comprising a loop conductor 32 which forms the inductive part of the circuit and a capacitor 33 in series with this inductor.

Figure 5A:
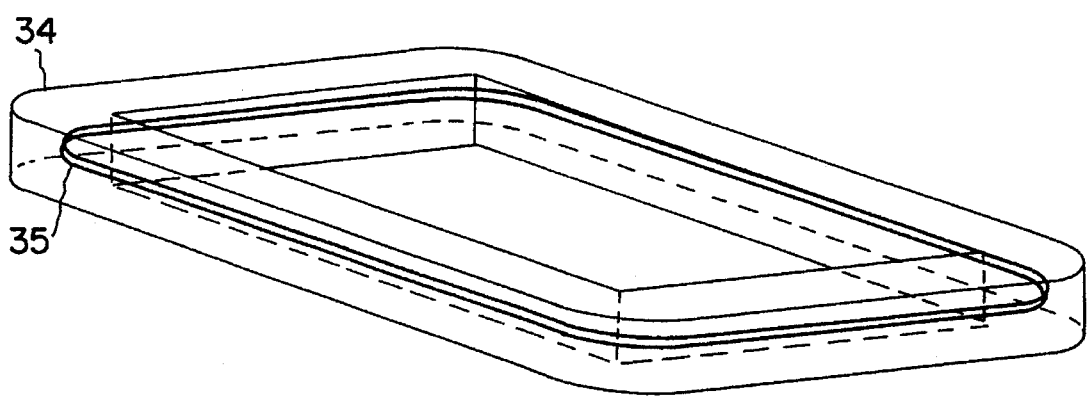
FIG. 5a is a pictorial diagram of a frame form subassembly.
Figure 5B:
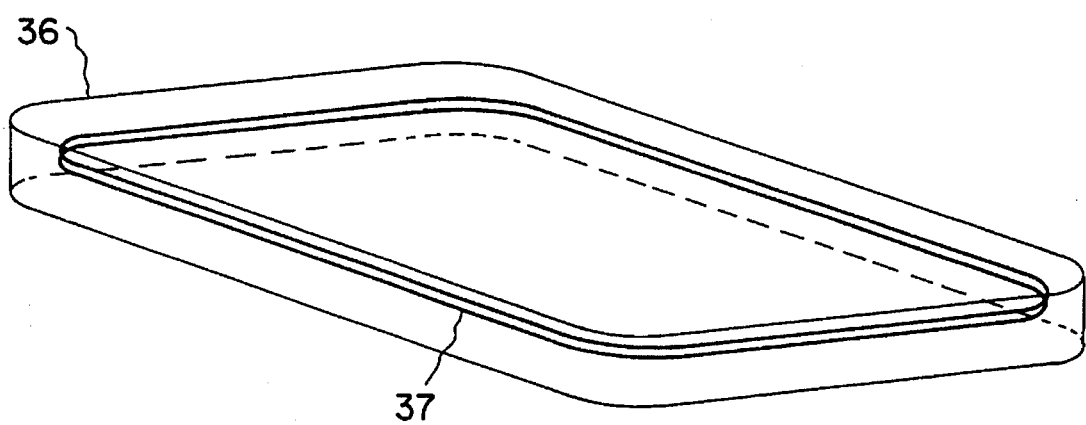
FIG. 5b is a pictorial diagram of a plate form subassembly.

FIG. 5 depicts alternative enclosure forms for the individual subassemblies. In FIG. 5a is shown a frame form 34 which encloses the conducting loop circuits 35. The internally contained loop circuits 35 are depicted by emboldened lines. The frame form 34 is a largely rectangular loop with an arbitrary cross-section. This shape is a convenient one since it is compatible with the rectangular solid shape of most CRT devices. The shape of the frame form of this invention is not limited to the rectangular geometry. The frame form can constitute a hollow enclosure or a solid molding, preferably made of rigid plastic. FIG. 5b shows a plate form 36 which is a largely rectangular and is either a hollow enclosure or a solid molding containing conducting loop circuits 37.

Figure 6A:
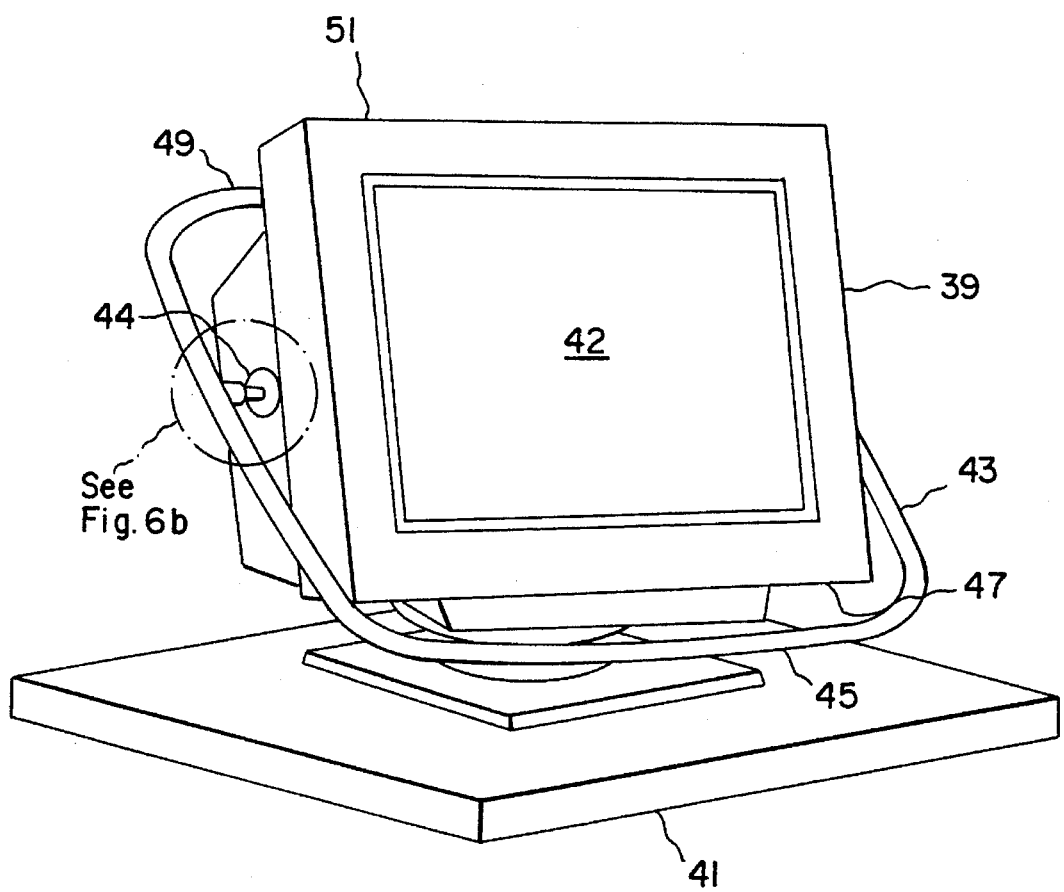
FIG. 6a is a pictorial diagram, of a preferred embodiment of the present invention installed on a CRT device.
Figure 6B:
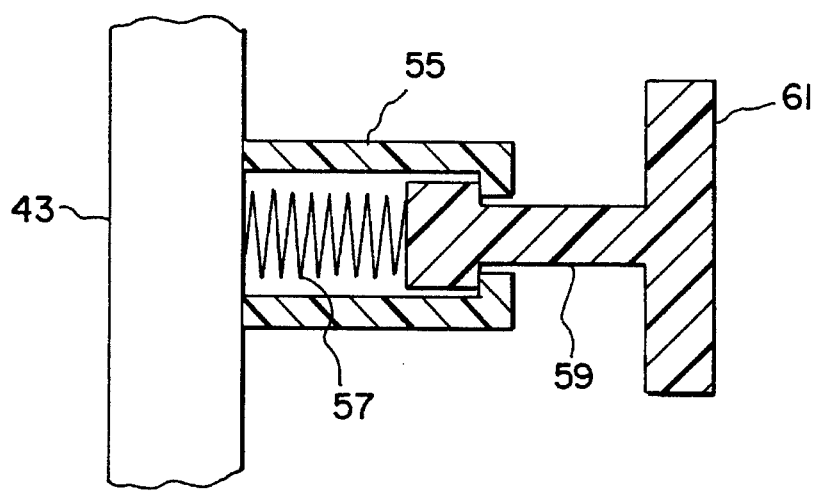
FIG. 6b is a cross-sectional diagram of a means of attaching a subassembly to a CRT device.

FIG. 6a is a pictorial diagram of a preferred embodiment of the present invention comprising two conducting loop subassemblies. Shown is a CRT device 39 placed atop a plate form subassembly of conducting loop circuits 41. The subassembly 41 should extend about 3 to 4 inches from the screen 42 of the CRT device 39. The other edges of the subassembly should extend about 2 inches from the corresponding edges of the CRT device 39. In this manner, the closed loop circuits of subassembly 41 occupy an area in the proximal perimeter of the CRT device. An additional frame form subassembly of conducting loops circuits 43 is shown movably attached to CRT device 39 by two spring loaded contacting elements 44 positioned on opposite sides of the CRT device 39. In operational use, subassembly 43 is oriented with a first edge 45 positioned below and parallel to the lower leading edge 47 of the CRT device 39 and with a second edge 49, parallel to the first edge 45, positioned above and behind the upper leading edge 51 of CRT device 39. Inasmuch as contacting elements 44 act as pivot points for subassembly 43, the preferred position of subassembly 43 is maintained by providing additional weight to upper edge 49 in the design of subassembly 43. FIG. 6b provides a cross-sectional view of one of the contacting elements 44 affixed to subassembly 43. A plunger element 59 is captivated by a housing 55 and is in contact with spring 57. A foot 61 is formed on one end of the plunger element 59 for compressive contact with the housing of the CRT device 39. It is understood that the scope of the present invention includes other configurations of closed loop circuit subassemblies that are placed in proximity to a CRT device as well as many alternative means of attachment or placement of the subassemblies in proximity to the CRT.

I claim:

1. In combination with a cathode ray tube device enclosed in a housing, an apparatus for reducing stray pulsating magnetic fields, comprising a system of electrically insulated conducting loop circuits contained within an enclosing form, said enclosing form being disposed externally and in proximity with the housing of said cathode ray tube device.

2. An apparatus as recited in claim 1, wherein said enclosing form has attachment means for affixing said system in proximity to said cathode ray tube device.

3. An apparatus as recited in claim 1, wherein said enclosing form is an encapsulating structure, said encapsulating structure formed by conventional molding means.

4. An apparatus as recited in claim 1, wherein said enclosing form is of a frame geometry.

5. An apparatus as recited in claim 1, wherein said enclosing form is of a plate geometry.

6. In combination with a cathode ray tube device enclosed in a housing, an apparatus for reducing stray pulsating magnetic fields, comprising a system of electrically insulated conducting loop circuits disposed externally and in proximity with the housing of said cathode ray tube device, wherein said system of electrically insulated conducting loop circuits is a set of separate electrically insulated conducting loop subassemblies, each said subassembly containing said conducting loop circuits within an enclosing form, said subassemblies placed in different locations external to said cathode ray tube device to improve attenuation of stray magnetic fields from said cathode ray tube device.

7. An apparatus as recited in claim 6, wherein each said electrically insulated conducting loop subassembly contains a group of separate parallel closed loop circuits.

8. An apparatus as recited in claim 7, wherein said separate parallel closed loop circuits further comprise closed loop conductors.

9. An apparatus as recited in claim 6, wherein each said electrically insulated conducting loop subassembly contains a coil having a multiplicity of turns, the ends of said coil electrically connected together so as to form a closed circuit.

10. An apparatus as recited in claim 6, wherein each said electrically insulated conduction loop subassembly contains closed loop circuits taken from the group of topologies consisting of (a) a multiplicity of parallel distinct closed loop circuits and (b) a coil having ends electrically connected together.

11. An apparatus as recited in claim 6, wherein each said electrically insulated conducting loop subassembly preferentially affects the attenuation of a specific frequency band of stray magnetic fields emanated from said cathode ray tube device.

12. An apparatus as recited in claim 6, wherein said conduction loop circuits of said electrically insulated conducting loop subassembly are made electrically resonant at specific frequencies.

13. An apparatus as recited in claim 12, wherein said conducting loop circuits of said electrically insulated conducting loop subassembly are made electrically resonant at specific frequencies by use of series capacitors placed in said conducting loop circuits so as to resonate with the inductance of said conducting loop circuits.

14. An apparatus as recited in claim 6, wherein said system of electrically insulated conducting loop circuits comprises two said subassemblies, having largely planar geometries, with a first said subassembly placed immediately adjacent and beneath said cathode ray tube device with the plane of said conducting loop circuit contained therein parallel to the horizontal dimension of said cathode ray tube device, and with a second said subassembly in the form of a rectangularly-shaped planar loop having a first side placed adjacently below and parallel to the lower leading edge of said cathode ray tube device and the second side which is parallel to said first side, placed above and behind the upper leading edge of said cathode ray tube device.

15. An apparatus as recited in claim 14, wherein said second subassembly has affixing means for placement of said subassembly in proximity and in fixed spatial relationship to said cathode ray tube device.

16. A method of reducing stray pulsating magnetic fields generated by a cathode ray tube device enclosed in a housing, said method comprising the steps of:

a) forming a system of electrically insulated conducting loop circuit subassemblies, each said electrically insulated conducting loop circuit subassembly comprising a minimum of one conducting loop within an enclosing housing; and b) placing said electrically insulated conducting loop circuit subassemblies in positions external and proximate to the housing of said cathode ray tube device so as to reduce stray pulsating magnetic fields generated by said cathode ray tube device without opening the housing of said cathode ray tube device.

17. A method as recited in claim 16, wherein said conducting loop circuits are placed in different locations external to said cathode ray tube device.

18. A method as recited in claim 17, wherein said system of electrically insulated conducting loop circuits comprises two said subassemblies, having largely planar geometries, with one said subassembly placed immediately adjacent and beneath said cathode ray tube device with the plane of said conducting loop circuit contained therein parallel to the horizontal dimension of said cathode ray tube device, and with a second said subassembly in the form of a rectangularly-shaped planar loop having a first side placed adjacently below and parallel to the lower leading edge of said cathode ray tube device and the second side which is parallel to said first side, placed above and behind the upper leading edge of said cathode ray tube device.

19. A method as recited in claim 16, wherein said conducting loop circuits are electrically resonant, said resonant loops providing improved reduction of said stray pulsating magnetic fields external to said cathode ray tube device at specific frequencies.

* * * * *